(12) United States Patent
Follmer et al.

(10) Patent No.: US 9,448,066 B2
(45) Date of Patent: Sep. 20, 2016

(54) METHODS AND APPARATUS FOR JAMMABLE HCI INTERFACES

(71) Applicant: Massachusetts Institute of Technology, Cambridge, MA (US)

(72) Inventors: Sean Follmer, Somerville, MA (US); Daniel Leithinger, Cambridge, MA (US); Hiroshi Ishii, Cambridge, MA (US); Alex Olwal, Stockholm (SE)

(73) Assignee: Massachusetts Institute of Technology, Cambridge, MA (US)

( * ) Notice: Subject to any disclaimer, the term of this patent is extended or adjusted under 35 U.S.C. 154(b) by 719 days.

(21) Appl. No.: 13/864,663

(22) Filed: Apr. 17, 2013

(65) Prior Publication Data

US 2013/0275082 A1 Oct. 17, 2013

Related U.S. Application Data

(60) Provisional application No. 61/625,255, filed on Apr. 17, 2012.

(51) Int. Cl.
*G06F 3/044* (2006.01)
*G06F 3/041* (2006.01)
(Continued)

(52) U.S. Cl.
CPC .............. *G01B 21/00* (2013.01); *G01B 21/20* (2013.01); *G06F 3/041* (2013.01); *G06F 3/044* (2013.01); *G06F 3/0425* (2013.01); *G06F 2203/04102* (2013.01); *G06F 2203/04103* (2013.01)

(58) Field of Classification Search
CPC .............. G06F 3/044; G06F 3/0416; G06F 2203/04104; G01V 3/12; G01N 21/553; G01N 21/554; G01N 21/51; G01N 2035/00019; G01N 2015/0693; A61B 5/1455; A61B 2010/008
USPC .......... 324/334, 344, 658, 72; 345/174, 173, 345/175, 156; 702/11
See application file for complete search history.

(56) References Cited

U.S. PATENT DOCUMENTS

| 6,529,277 B1 * | 3/2003 | Weitekamp ............ B82Y 10/00 356/445 |
| 2003/0123335 A1 * | 7/2003 | Rettner .................. B82Y 10/00 369/13.24 |

(Continued)

OTHER PUBLICATIONS

Multitouch Technologies, NUI Group, Version 1.0, NUI Group Authors, Dec. 4, 2009; Retrieved from the Internet: <URL: http://nuigroup.com/?ACT=28&fid=66&aid=2987_PAXD5bVCWMGIDrcJI1Ya>.*

(Continued)

*Primary Examiner* — Toan Le
*Assistant Examiner* — Jeffrey Aiello
(74) *Attorney, Agent, or Firm* — Stephen R. Otis

(57) ABSTRACT

In exemplary implementations of this invention, a jammable structure functions as an HCI interface. A user provides input by changing the shape of a flexible layer of the jammable structure (e.g., by pressing against it or stretching, twisting or bending it) and receives haptic feedback (e.g., varying stiffness). Sensors are used to determine the shape of the flexible layer. The sensors output data that is indicative of electromagnetic waves that have traveled through the jammable media or of electrical or magnetic phenomena that are produced by the waves. For example, visible or infrared light may be shone through a transparent jammable media to the flexible layer and reflect back to a camera. The media may comprise granular particles (e.g., glass beads) and a liquid (e.g., oil) with matching indices of refraction. Or capacitive sensing may be used to detect the shape of the flexible layer.

10 Claims, 14 Drawing Sheets

(51) Int. Cl.
    G01B 21/20    (2006.01)
    G01B 21/00    (2006.01)
    G06F 3/042    (2006.01)

(56) References Cited

U.S. PATENT DOCUMENTS

| | | | | |
|---|---|---|---|---|
| 2004/0169328 A1* | 9/2004 | Guddanti | ............... | B65H 1/266 271/147 |
| 2005/0008308 A1* | 1/2005 | Bita | ................. | B82Y 20/00 385/123 |
| 2005/0013477 A1* | 1/2005 | Ratti | ................. | G06K 9/20 382/154 |
| 2006/0000970 A1* | 1/2006 | Williford | ............ | H01S 5/06832 250/239 |
| 2008/0105826 A1* | 5/2008 | Mercure | ............ | H01Q 15/0086 250/394 |
| 2009/0001262 A1* | 1/2009 | Visser | ................ | H01J 49/0036 250/282 |
| 2009/0125254 A1* | 5/2009 | Kotter | ................ | G06F 17/5036 702/57 |
| 2010/0253651 A1* | 10/2010 | Day | ..................... | G06F 3/044 345/175 |
| 2011/0175671 A1* | 7/2011 | Reynolds | ............ | H03K 17/962 327/517 |
| 2012/0274599 A1* | 11/2012 | Schediwy | ............... | G06F 3/016 345/174 |
| 2013/0065777 A1* | 3/2013 | Altug | ................... | G01N 21/554 506/9 |

OTHER PUBLICATIONS

Follmer, S., Johnson, M., Adelson, E., Ishii, H., 2011, deForm: an interactive malleable surface for capturing 2.5D arbitrary objects, tools and touch. UIST '11, Proceedings of the 24th annual ACM symposium on User interface software and technology, pp. 527-536, ACM Press, New York, NY, USA,Oct. 2011.

Mazzone, A., Spagno, C., Kunz, A., 2004 The HoverMesh, ACE '04, Proceedings of the 2004 ACM SIGCHI International Conference on Advances in computer entertainment technology, pp. 187-193, ACM Press, New York, NY, USA, 2004.

Baillot, Y., Eliason, J., Schmidt, G., Swan, J., Brown, D., Julier, S., Livingston, M., Rosenblum, L., 2003, Evaluation of the ShapeTape Tracker for Wearable, Mobile Interaction, Proceedings of IEEE Virtual Reality 2003, pp. 285-286, IEEE Computer Society, 2003.

Matoba, Y., Sato, T., Takahashi, N., Koike, H., Aug. 2012, ClaytricSurface: An Interactive Surface With Dynamic Softness Control Capability, ACM SIGGRAPH 2012 Emerging Technologies, Article No. 6 , ACM New York, NY, USA, Aug. 2012.

Vlack, K., Mizota, T., Kawakami, N., Kamiyama, K., Kajimoto, H., Tachi, S., 2005, Gelforce: a vision-based traction field computer interface, CHI '05 Extended Abstracts on Human Factors in Computing Systems pp. 1154-1155, ACM Press, New York, NY, USA, 2005.

Han, H., Arimoto, S., Tahara, K., Yamaguchi, M., Nguyen, P., 2001, Robotic Pinching by Means of a Pair of Soft Fingers with Sensory Feedback, Proceedings of the 2001 IEEE International Conference on Robotics & Automation, vol. 1, pp. 97-102, 2001.

Brown, E., Rodenberg, N., Amend, J., Mozeika, A., Steltz, 3. Zakin, M., Lipson, H., Jaeger, H., 2010, Universal robotic gripper based on the jamming of granular material, Proceedings of the National Academy of Sciences, vol. 107, No. 44, 2010, pp. 18809-18814.

Cassinelli, A., Ishikawa, M., 2005, Khronos projector. Proceedings, ACM SIGGRAPH 2005 Emerging Technologies, SIGGRAPH '05, article 10, ACM Press, New York, New York, USA, 2005.

Han, J., 2005, Low-cost multi-touch sensing through frustrated total internal reflection. UIST '05 Proceedings of the 18th annual ACM symposium on User interface software and technology, pp. 115-118, ACM Press, New York, NY, USA , 2005.

Petkovic, D. , Pavlovic, N., 2012, A New Principle of Adaptive Compliant Gripper. Mechanisms, Transmissions and Applications, Mechanisms and Machine Science vol. 3, pp. 143-150, Springer Netherlands, 2012.

Amend, J., Brown, E., Rodenberg, N., Jaeger, H., Lipson, Apr. 2012, A Positive Pressure Universal Gripper Based on the Jamming of Granular Material, IEEE Transactions on Robotics, vol. 28, pp. 341-350, Apr. 2012.

Coelho, M., Zigelbaum, J., 2011, Shape-changing interfaces. Personal and Ubiquitous Computing, vol. 15 Issue 2, Feb. 2011, pp. 161-173, Springer-Verlag London, UK.

Hemmert, F., Hamann, S., Lowe, M., Wohlauf, A., Joost, G., 2010, Shape-changing mobiles: tapering in one-dimensional deformational displays in mobile phones. TEI 2010, Proceedings of the fourth international conference on Tangible, embedded, and embodied interaction, pp. 249-252, ACM Press, New York, NY, US, 2010.

Herkenrath, G., Karrer, T., Borchers, J., 2008, Twend: twisting and bending as new interaction gesture in mobile devices. CHI '08 Extended Abstracts on Human Factors in Computing Systems, pp. 3819-3824, ACM Press, New York, NY, USA 2008.

Hilliges, O., Kim, D., Izadi, S., 2008, Creating malleable interactive surfaces using liquid displacement sensing. In Tabletop 2008, Proceedings of 3rd IEEE International Workshop on Horizontal Interactive Human Computer Systems, 2008, pp. 157-160, IEEE Press 2008.

Hook, J., Taylor, S., Butler, A., Villar, N., Izadi, S., 2009, A reconfigurable ferromagnetic input device. UIST 2009, Proceedings of the 22nd annual ACM symposium on User interface software and technology, pp. 51-54, ACM Press, New York, NY, USA, 2009.

Ishii, H., Ratti, C., Piper, B.,Wang, Y., Biderman, A., Ben-Joseph, E., 2004, Bringing Clay and Sand into Digital Design Continuous Tangible User Interfaces. BT Technology Journal, vol. 22, Issue 4, Oct. 2004, pp. 287-299, Kluwer Academic Publishers Hingham, MA, USA.

McDonald, K., editor, Structured Light 3D Scanning Implementations, published on Internet at https://sites.google.com/site/structuredlight/implementations, first captured by Internet Archive Wayback Machine on Sep. 12, 2009.

Sokolova, N., et al., Experiments in Stereo Vision, published on Internet at http://disparity.wikidot.com/, last edited on Dec. 12, 2006.

Verma, C., et al., Photometric Stereo, published on Internet at http://pages.cs.wisc.edu/~csverma/CS766_09/Stereo/stereo.html, first captured by Internet Archive Wayback Machine on Jan. 10, 2010.

Mare, Shape from Shading Matlab and C++(MFC) source, published on Internet at http://study.marearts.com/2011/08/shape-from-shading-matlab-source.html, Aug. 2007.

Thulin, S., Infrared Multitouch Interface MQP Final Report, published on Internet at http://www.wpi.edu/Pubs/E-project/Available/E-project-011310-202437/unrestricted/Project_Final_Report_-_Revised_2.pdf, Jan. 13, 2010.

Paradiso, J. et al., Musical Applications of Electric Field Sensing, published on Internet at http://resenv.media.mit.edu/pubs/papers/96_04_cmj.pdf, Apr. 1996.

Smith, J. et al. Electric field sensing for graphical interfaces, published in IEEE Computer Graphics and Applications, vol. 18, Issue 3, 1998.

* cited by examiner

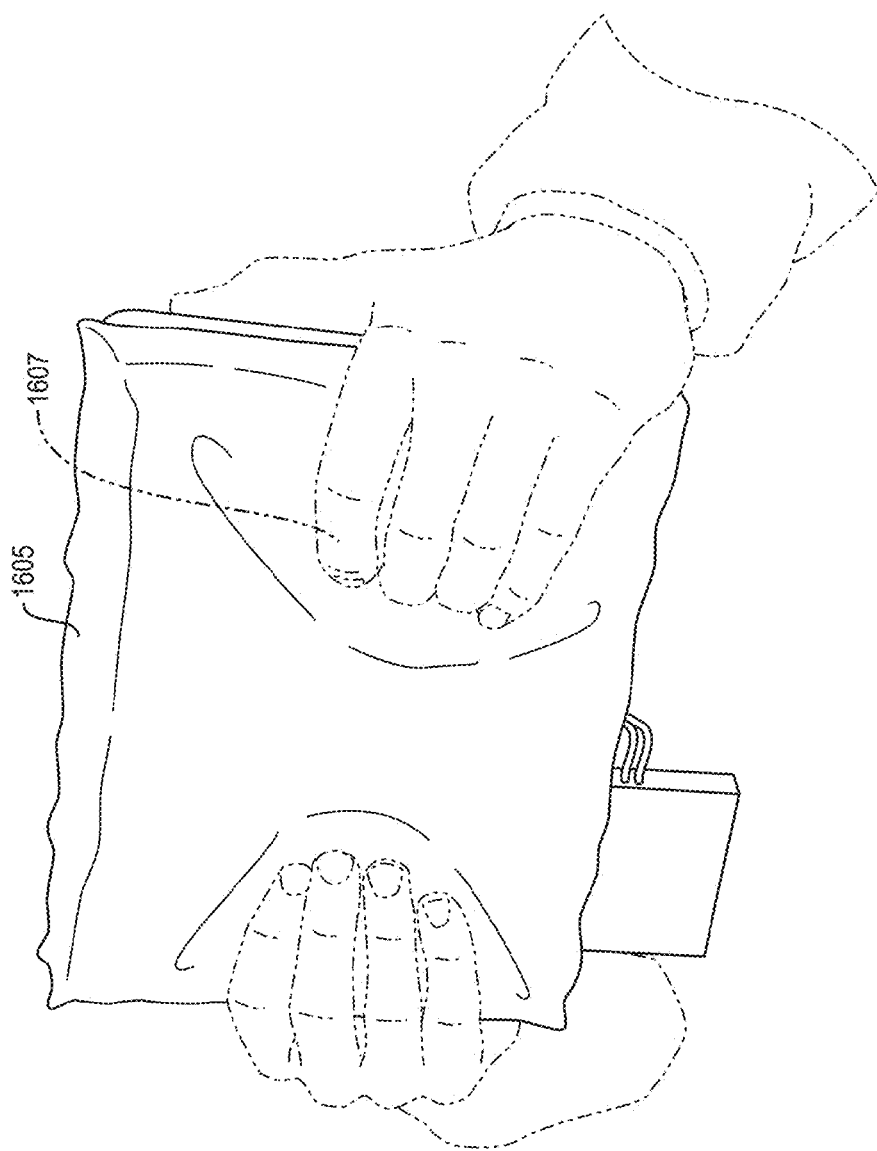

METHODS AND APPARATUS FOR JAMMABLE HCI INTERFACES

RELATED APPLICATION

This application is a non-provisional of, and claims the benefit of the filing date of, U.S. Provisional Application Ser. No. 61/625,255 filed Apr. 17, 2012, the entire disclosure of which is herein incorporated by reference.

STATEMENT REGARDING FEDERALLY SPONSORED RESEARCH OR DEVELOPMENT

This invention was made with U.S. government support under Grant Number 112374, awarded by the National Science Foundation. The government has certain rights in this invention.

FIELD OF THE TECHNOLOGY

The present invention relates generally to jammable HCI interfaces.

BACKGROUND OF THE INVENTION

Jamming is a process in which a material becomes more rigid as its density increases. For example, jamming can occur when granular particles in a jammable media become more densely packed.

SUMMARY

In exemplary implementations of this invention, a jammable structure functions as a human computer interaction (HCI) interface. A human user can provide input to a computer by changing the shape of a flexible layer of the jammable structure (e.g., by pressing against the layer or stretching, twisting or bending the layer). The user may receive haptic feedback through the jammable structure. For example, varying stiffness of the jammable structure may provide feedback.

The jammable structure comprises a container that encloses a jammable media. A least a portion of the container has a flexible boundary layer. This boundary layer may comprise a flexible, stretchable silicon membrane. The jammable media comprises granular particles (e.g., glass beads, sand, or coffee grounds) and an interstitial fluid.

A pump may be used to remove the fluid from the container, creating a partial vacuum that causes the surrounding atmosphere to exert pressure on the container and thus causes the jammable media to jam (become rigid). In order to unjam the jammable media (make it flexible), the pump may add fluid to the container. If the fluid is a gas (e.g., air at room temperature), a pneumatic pump may be used. If the fluid is a liquid, a hydraulic pump may be employed.

In order to detect human input, one or more sensors are used to determine the shape of the flexible layer of the jammable structure. The sensors output data that is indicative of electromagnetic waves that have traveled through the jammable media or of electrical or magnetic phenomena that are produced by waves that have traveled through the jammable media.

For example, visible or infrared light may be shone through the jammable media to the underside of the flexible layer (i.e., the side of the flexible layer opposite where the user is touching the layer), and then reflect back to one or more cameras. In this case, a transparent jammable media is employed. In order to make the jammable media transparent, the media may comprise transparent granular particles (e.g., glass beads) and a liquid (e.g., oil) with matching indices of refraction.

Or, for example, capacitive sensing may be used to detect the shape of the flexible layer. In this capacitive sensing, the jammable media functions as a known dielectric material between transmitting and receiving electrodes, and the amplitude of the received signal is proportional to the distance between them. In addition, mutual capacitive sensing may be used to determine touch or proximity of a human hand or finger.

The jammable HCI interface has many practical applications. Here are four non-limiting examples. First, a jammable HCI interface may be mounted on the back of a tablet computer for input to, and haptic feedback from, the tablet. Second, it may be mounted on a tabletop and the jammable media may have a clay-like consistency. In that case, a user may sculpt the jammable media in order to modify a 3D virtual model. Third, the jammable HCI interface may house a mobile electronic device. A user can change the shape of the device. The affordance of the device can vary with its shape, e.g., from a phone, to a tablet, to a watch. Fourth, the jammable HCI interface may comprise a transparent "lens" in which the jammable media comprises index-matched liquid and glass beads, covered by transparent flexible membrane. The "lens" changes its stiffness depending on the position, on the lens, that the user is pressing. For example, if the user is pressing a region of the lens in which an image of water is displayed, the "lens" may be unjammed and extremely soft. Or, for example, if the user is pressing a region of the "lens" in which an image of a rock is displayed, the "lens" may be jammed and hard.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

In FIG. 14, electrode leads to a controller are shown. In FIG. 15, the jammable material is shown.

FIGS. 16A and 16B are views of a tablet computer with a jammable HCI interface. FIG. 16A shows the front of the tablet. FIG. 16B shows the back of the tablet.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
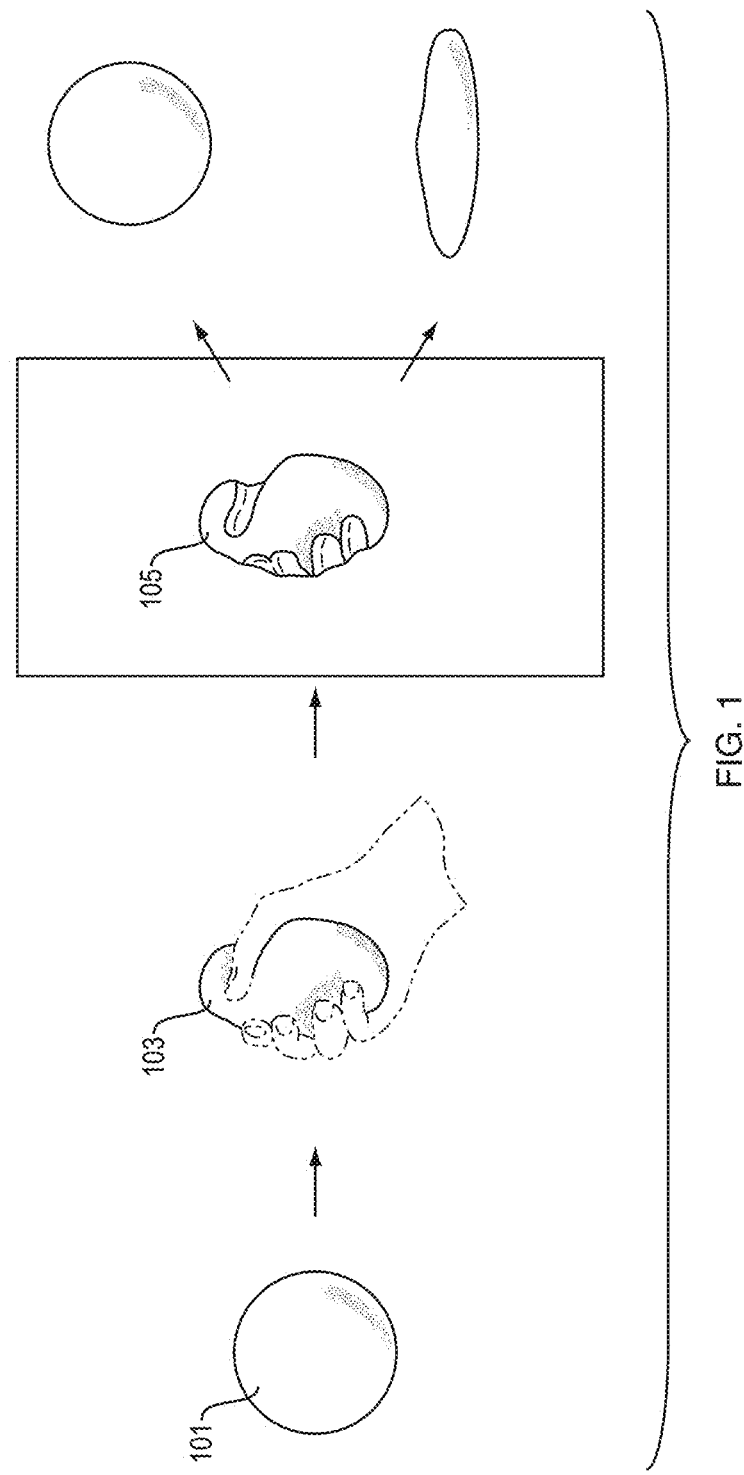
FIG. 1 shows examples of shape transitions by a jammable device.

Jamming:

FIG. 1 shows examples of shape transitions by a jammable device. The device starts in an initial shape 101. While the device is in an unjammed (flexible) state, it is deformed into a new shape 103 by a user. Then the device is jammed into a stiff shape to retain the deformation 105. When unjammed again, the object can return to its original shape, e.g., if there are internal spring forces or the device is deformed due to gravity.

Jamming can be employed in human computer interaction (HCI) interfaces. A jammable interface can change its material stiffness to emulate interaction with different materials, or to increase the degree of control over material in the interface. Jamming can enable shape-changing user interfaces, by increasing the rigidity of a certain shape, while remaining easily actuated in another. In addition, jamming interfaces may be user defined and provide a wide design space of possible shapes.

In exemplary implementations of this invention, a jamming system comprises the jammable material, a housing assembly (usually a non-porous, flexible membrane), a vacuum source or pump, a pressure-controlling valve, and a pressure sensor. Closed-loop control is used to achieve desired vacuum pressures. While pressure relates to the magnitude of jamming, there is not necessarily a linear relationship between pressure and system stiffness.

In a prototype of this invention, a pneumatic jamming system is employed. The system measures and controls the difference between atmospheric and internal volume pressure, such that particle jamming in the structure provides varying stiffness.

Figure 2:
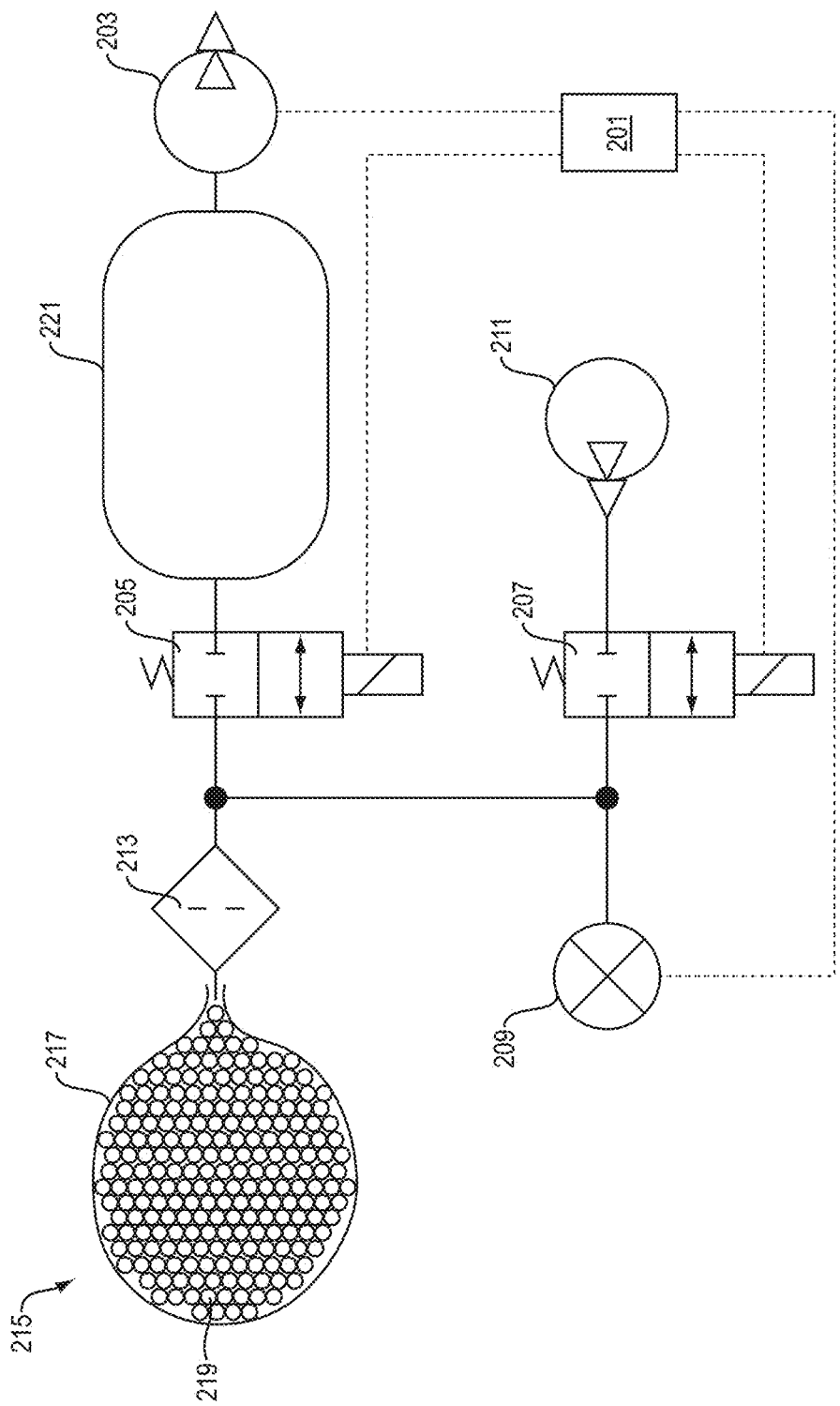
FIG. 2 shows a pneumatic jamming system.

FIG. 2 illustrates this prototype of a pneumatic jamming system. An Atmel® AVR® microcontroller 201 interfaces with (i) a 12V DC vacuum pump 203 with a 20 cm$^3$/s maximum flow rate and a maximum vacuum pressure of 65 kPa, (ii) two 12V DC solenoid valves 205, 207, (iii) an analog pressure sensor 209, and (iv) a compressor 211. The vacuum pump, solenoid valves, pressure sensor and compressor are connected to the jammable module with 0.635-cm-diameter tubing. A filter 213 prevents granular particles (included in the jammable media) from entering the air lines. The jammable structure 215 comprises a flexible skin 219 surrounding a jammable media 217. The jammable media 217 comprises granules surrounded by an interstitial fluid. In the example shown in FIG. 2, the fluid is air. The dotted lines in FIG. 2 are wired or wireless connections between the microcontroller 201 and other hardware components of the system.

In the example in FIG. 2, the degree of jamming is determined by the differential jamming pressure—i.e., the difference between atmospheric and internal volume pressure for the jammable module. For example, a balloon that is filled with jamming media and is open to atmospheric pressure, is near the jamming transition, since little fluid volume needs to be removed to induce jamming. The differential jamming pressure can, however, be raised to increase the mechanical stiffness of the system.

While jamming speed is typically limited by the vacuum pump's and pressure-control valve's flow rates, it can be increased through the use of an in-line reservoir (e.g., 221 in FIG. 2). For example, a PVC pipe can be added to build up vacuum pressure to increase jamming speeds. In addition, unjamming speeds can be increased by adding a positive pressure source (e.g., the compressor 211 in FIG. 2).

A single actuator can be used for jamming a freeform malleable device: in order to "lock" the device in a rigid shape, to "unlock" the device in a fully flexible state, and to achieve a continuum of stiffness in between. To change the shape of the jammable device, another source of actuation can be used: e.g., a passive source, such as the user's force or gravity, or an active source, such as a pneumatic air muscle.

In some implementations of this invention, granular particles are combined with discrete element matrices as a hybrid approach to achieve smoother, higher-dimensional surfaces with variable stiffness. Also, passive, deformable shapes, with elastic or spring-loaded properties may be added to the volume to provide restoring forces, so that when unjammed, the device returns to a certain shape.

A single actuator for jamming the particles may not only be used to accelerate the unjamming in reverse-operation, but also may be employed to inflate the jamming shape. By drastically changing the particle/medium ratio through inflation, the fluid jamming medium can dominate the shape volume and the user's experience of it.

Variable material stiffness can be used as a degree-of-freedom (DOF) for an output device. The device stiffness can be directly mapped to represent object properties in simulation interfaces, such as various materials in a sculpting application. Stiffness can also be mapped to represent parameters, states and action in the user interface, as classical abstract haptic feedback.

Sensors may be used to detect users' freeform deformations of malleable devices, including 3D shapes, as well as interaction on and above surfaces. Sensors that can detect proximity and touch may be employed for detecting 2D and 3D non-planar surface manipulations, which can be relevant and useful for a number of interactions. Shape deformation can, besides the direct 1:1 manipulation of geometry representations, also be used in pattern-matching of shapes. This could, for example, allow the embodiment of functionality, such that the device's behavior and interface would adapt to its form factor, or trigger different actions.

Preferably, the granular material in the jammable material can achieve large changes in stiffness and jam in arbitrary freeform shapes. For example, ground coffee may be used as the granular material, in order to achieve a large dynamic range in stiffness and strength Glass beads provide a good balance of control and tactile stiffness response due to their smooth surfaces and low interparticle friction. This allows for a precise control over levels of stiffness for malleable manipulations, such as sculpting. Other properties, such as particle weight or membrane thickness and elasticity, can be optimized for a particular system design. The membrane qualities, for example, affect both the user's tactile experience and the jamming performance.

In exemplary implementations of this invention, jamming is employed in flexible electronic devices, including tablets, e-readers or cell phones. Preferably, the mobile jamming apparatus used in these mobile applications is compact and self-contained, which introduces constraints on size, flow rate, maximum vacuum force, power consumption and sound level (e.g., due to the vacuum pump). In a mobile device, jamming may be used for, among other things, haptic feedback, malleable input, and shape-changing structures.

Figure 3:
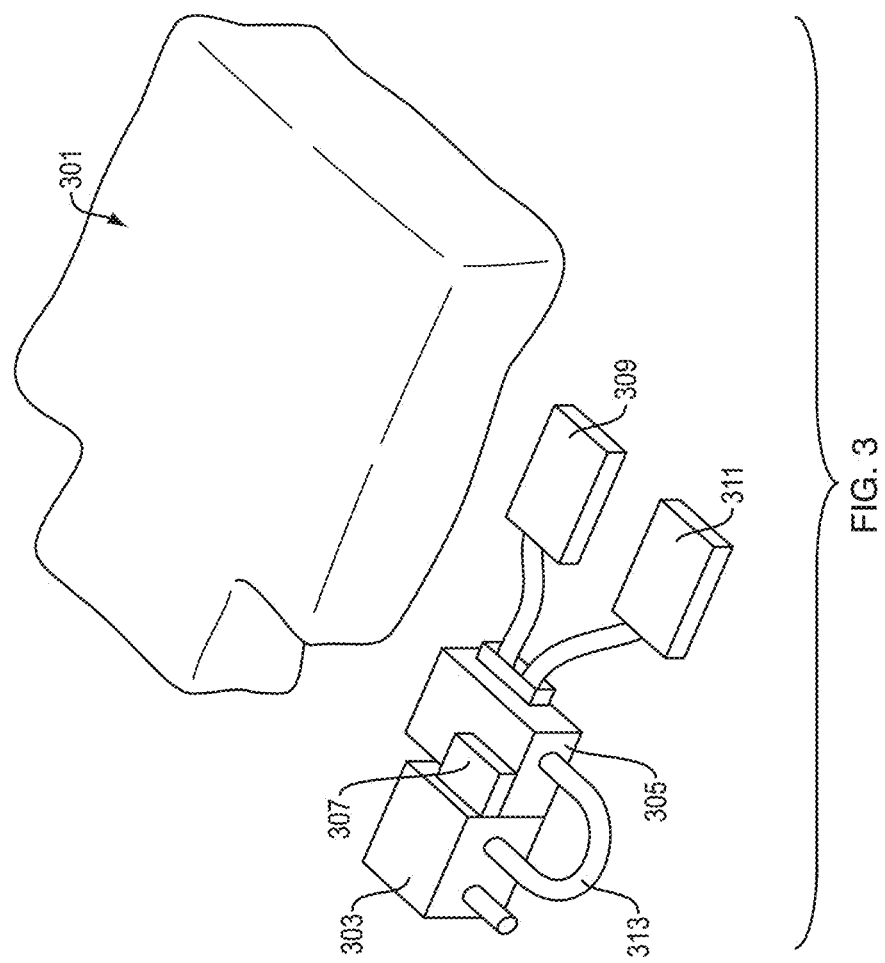
FIG. 3 shows a pneumatic jamming system for mobile device applications.

FIG. 3 illustrates a pneumatic jamming device for mobile applications, in an illustrative embodiment of this invention. This device is sometimes called a "Mobile Jamming Platform" or "MJP". The MJP comprises a jamming structure 301, small vacuum air pump 303, small solenoid valve 305, control circuit 307, two LiPo batteries 309, 311 and tubing 313, and measures 47×27×8 mm$^3$. The pump draws 0.12 A at 7.4V, and the batteries allow for one hour of continuous use of the pump, which means several hours in practice, as stiffness changes are rendered intermittently. In this embodiment, the MJP can jam/unjam a cell-phone-sized volume of coffee particles in approximately one second.

Figure 4:
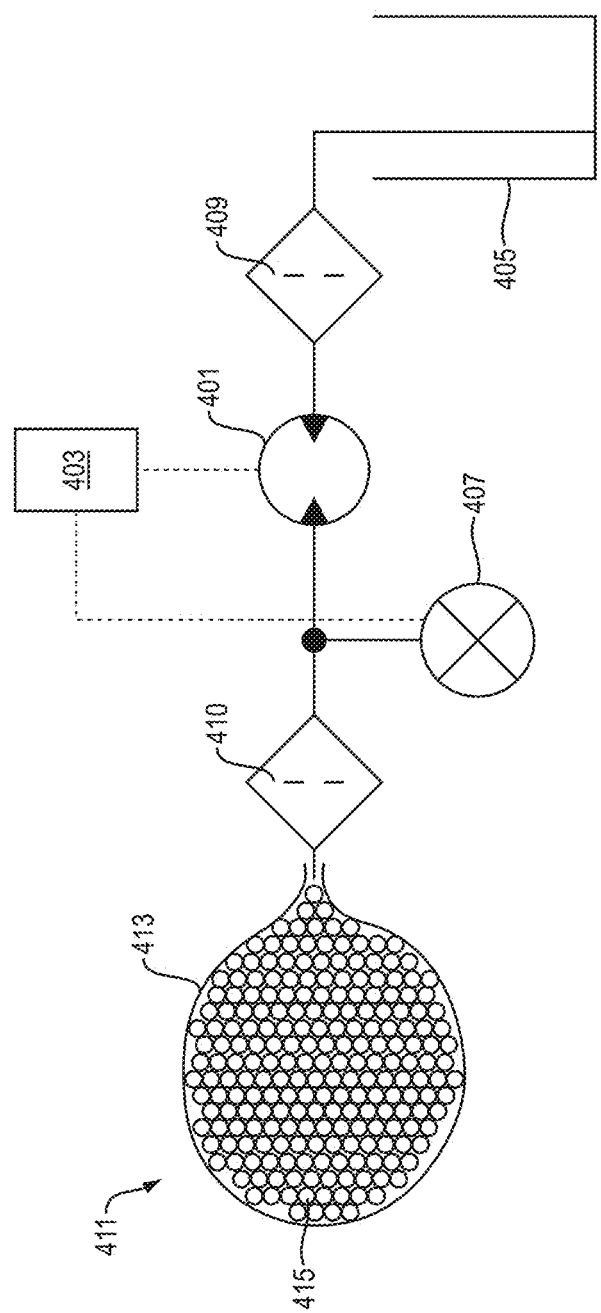
FIG. 4 shows a hydraulic jamming system.

In other prototypes of this invention, a hydraulic (rather than pneumatic) jamming system was employed. FIG. 4 illustrates such a hydraulic jamming system. A DC hydraulic gear pump 401, controlled by a control circuit (an H-bridge and microcontroller) 403, moves liquid in and out of the system from a reservoir 405 to change the differential jamming pressure. The pressure is digitally measured with a pressure sensor 407, and regulated by a control circuit 403 and a hydraulic pump 401. The hydraulic gear pump 401 is 7.62×10.16×5.08 cm$^3$, with a 2.3 liter/minute maximum flow rate and a maximum pressure of 151 kPa. Metal mesh filters 409, 410 prevent particles from entering the fluid line and the pump. The pressures required for jamming are significantly lower than pressures used in traditional hydraulic actuation systems because the pumps are not used to transmit large forces; rather the goal is to change the interior pressure of the jammable structure 411 in relation to the external air pressure of 101.325 kPa. The jammable structure 411 comprises a flexible skin 413 surrounding a jammable media 415. The jammable media 415 comprises granules surrounded by an interstitial fluid. In the example shown in FIG. 4, the fluid is a liquid. The dotted lines in FIG. 4 are wired or wireless connections between the control circuit and other hardware components of the system.

The hydraulic jamming system includes a closed-loop control system that measures and manages the differential jamming pressure. The hydraulic system can achieve higher stiffness, quieter (silent) operation and faster actuation than the pneumatic system, in prototypes of this invention.

In exemplary implementations of this invention, an HCI interface includes a malleable, jammable structure, whose shape can be manipulated by a user. In addition, the interface contains sensors for detecting user touch of the jammable structure and deformation caused by the user. For example, the sensors may be optical or capacitive.

Optical Sensing with Index-Matching:

For optical sensing, it can be preferable to position the camera(s) on the opposite side of the jammable structure than the surface which the user is touching. This positioning of the camera can avoid user interference and occlusion. In this position, however, the cameras must be able to "see through" the jammable media, including the granular material and the interstitial fluid (e.g., gas or liquid). This, in turn, requires that the jammable media be optically transparent.

A jamming system cannot provide optical transparency simply by using transparent particles, as each particle acts as a light-scattering lens, which makes the overall volume opaque. As light leaves the medium (e.g., air) and enters the particle (e.g., a glass bead), it refracts at an angle governed by Snell's law, due to the different refractive indices.

In illustrative implementations of this invention, refraction is suppressed by matching the refractive index (n) of the granular particles and the fluid in the jammable material. By suppressing refraction, an optically transparent volume is created.

In a prototype of this invention, index matching is achieved by using borosilicate (Pyrex®) glass beads (n=1.474) and vegetable oil (n=1.467–1.4736, depending on temperature and density). The volume is not completely transparent due to a slight deviation in the refractive indices.

However, the system is sufficiently transparent for optical sensing using projected reference patterns up to an 8 cm thickness of particles. The opacity was measured using a 2 mW red laser and a photometer at different reference thicknesses, and compared to glass beads alone (i.e., in air). 4 cm of glass beads and oil provides 94% transmission. 4 cm of glass beads alone (i.e., in air) provides virtually no transmission. 8 cm of glass beads and oil provides 47% transmission.

Alternately, a hydraulic jamming system with optical sensing through an optically transparent jammable media may use other types of fluids or particles, as long as the fluid and particles have matching refractive indices.

Figure 5:
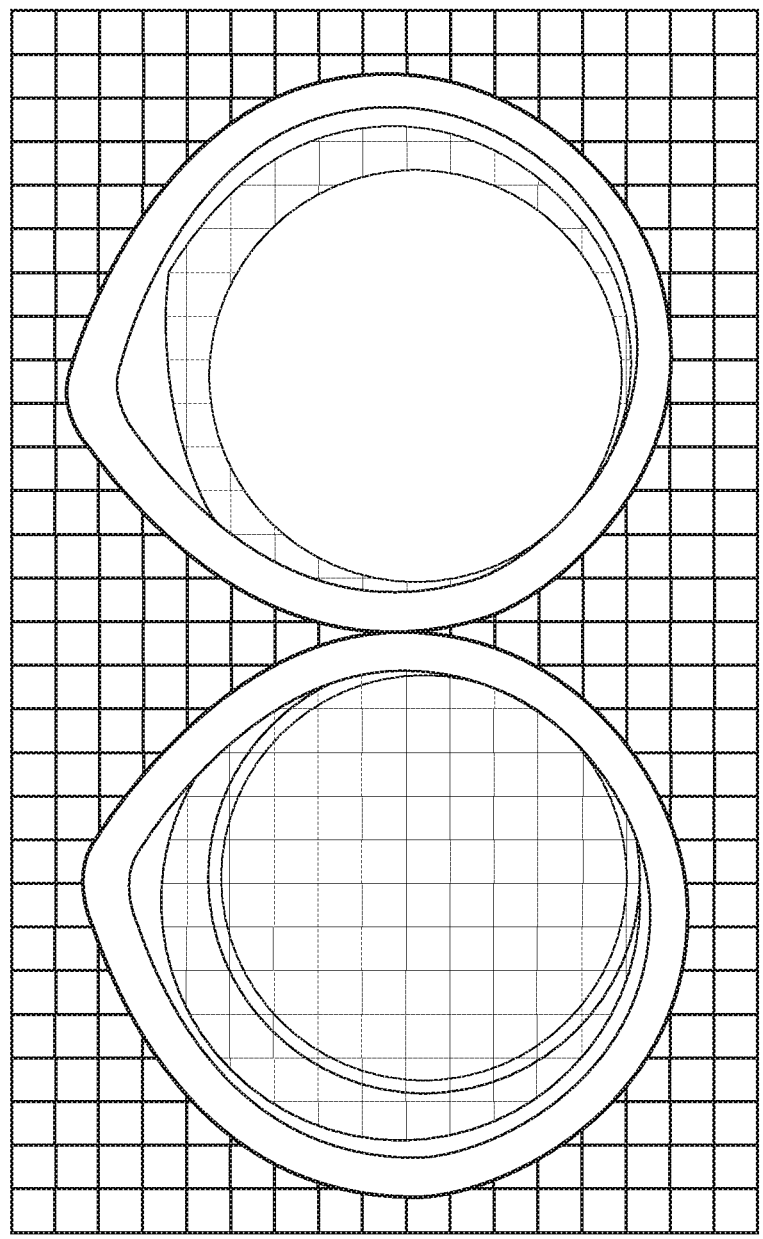
FIG. 5 illustrates transparency through index-matched liquid and particles.

FIG. 5 illustrates transparency through index-matched liquid and particles. The two beakers in the photo each contain 3.5 cm of 1 mm Pyrex® borosilicate glass beads. In the beaker on the left side of the photo, the glass beads are immersed in index-matched oil. In the beaker on the right side, the glass beads are immersed in air (which is not index-matched with the glass beads). On the left side, the oil reduces refraction as light enters and leaves each glass bead. The index matching in the beaker on the left drastically increases transparency, as compared to the beaker on the right.

In a prototype of this invention, this configuration (using index-matched glass beads and vegetable oil) allows a rear-mounted camera to see through the jammable media. The jammable device comprises a transparent jammable media (comprising index-matched fluid and glass beads), a transparent plastic bottom and an upper flexible silicone skin. With this configuration, a variety of different optical techniques may be used for surface reconstruction, including shape from shading, photometric stereo, embedded tracking markers in the skin, and structured lighting.

Figure 6:
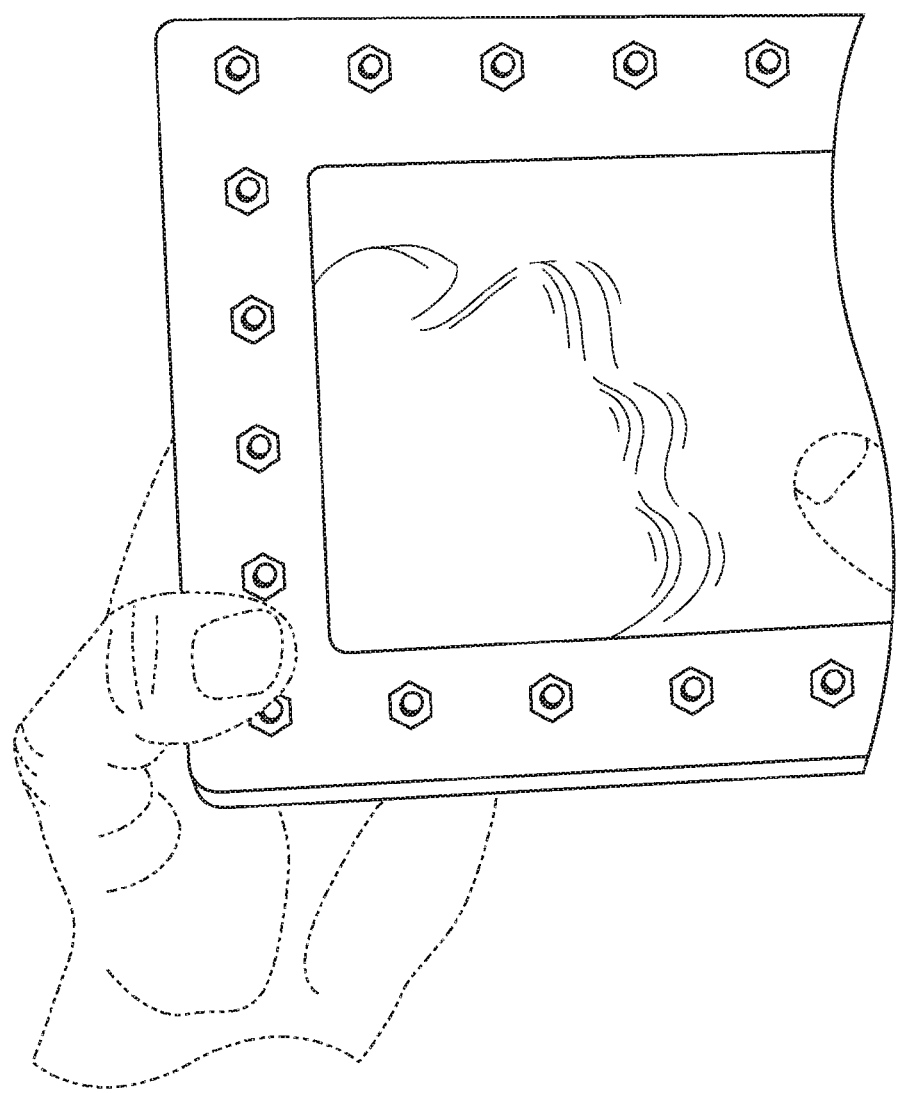
FIG. 6 shows surface deformations caused by fingers pressing on one side of a flexible surface of a jammable device. The deformations are visible from the other side of the surface, through jammable material comprising index-matched liquid and particles.

FIG. 6 shows surface deformations caused by fingers pressing on one side of a flexible layer of a jammable device. The deformations are visible from the other side of the layer, through 3 mm of jammable material comprising index-matched liquid and particles. In FIG. 6, the fingers are pressing against a flexible, silicon skin. The photo is a bottom view of the device, looking up to the bottom side of the silicon skin through (i) a clear plastic sheet at the bottom, and (ii) 3 mm of transparent jammable media (comprising index-matched liquid and glass beads).

In a prototype of this invention, an IR structured light 3D scanning system is used. The system was chosen due to its high resolution capture, ability to rear-project visible light content, and its flexibility with regards to changing cameras, projectors, and lenses. In this prototype, three sequential fringe patterns are rear-projected in IR onto the deformable skin and are captured in 640×480 pixels at 60 frames/s by a side-mounted, synchronized IR camera. The 3 mm-thick silicone skin, with a durometer of 10 shore A, can be stretched and deformed 30 mm above and below its resting height. The deformations of the three patterns are used to reconstruct 3D images at 20 frames/s from a 23×18 $cm^2$ region, at a spatial resolution of 28 pixels/cm, and 0-6 cm depth range, providing a 1-2 mm depth resolution.

Figure 7:
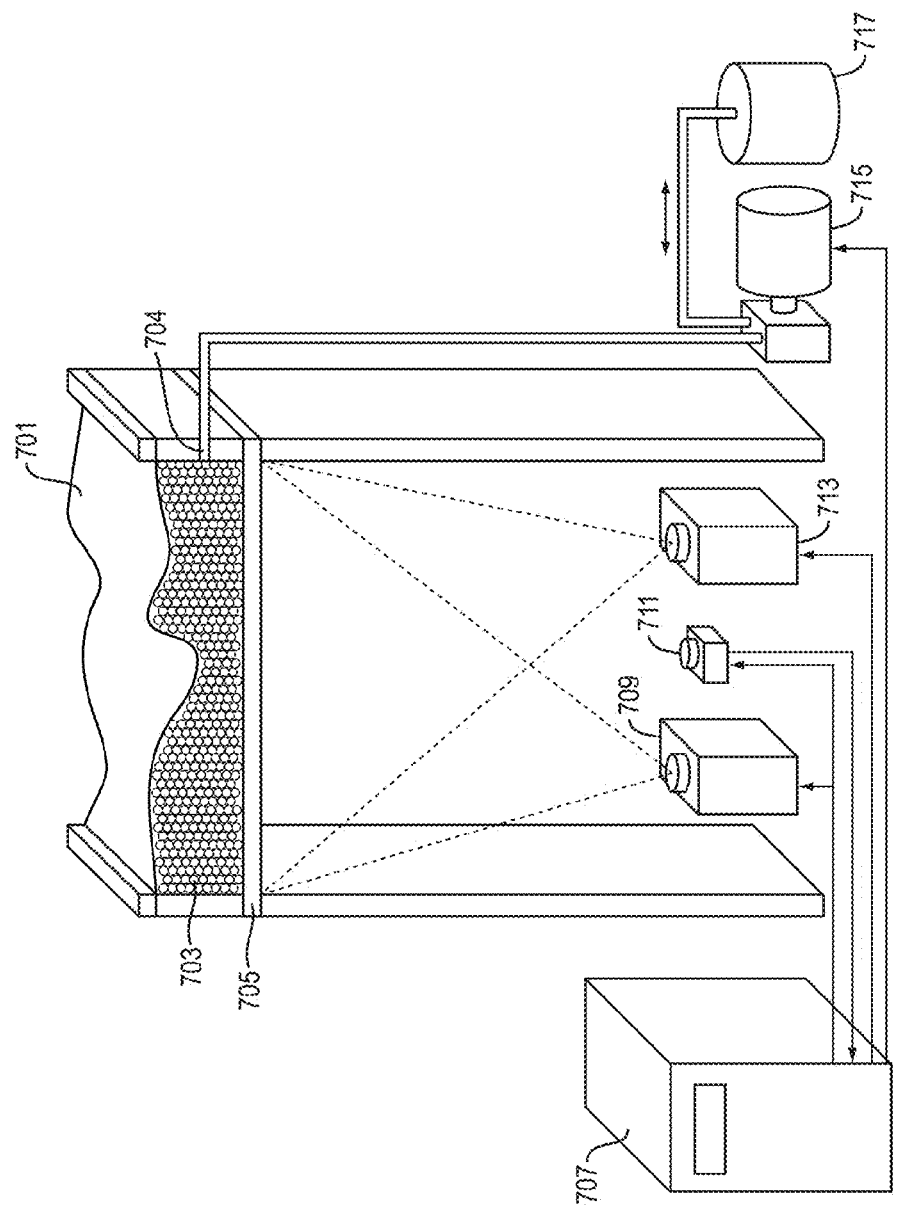
FIG. 7 shows a system for structured light 3D scanning with index-matched jamming.

However, this invention is not limited to that optical sensing strategy. When index matching is employed, a variety of optical sensor strategies may be used for detecting the shape of a surface of a jammable structure. These optical sensing strategies, with index-matching, include: (i) structured light 3D scanning; (ii) stereo vision 3D scanning; (iii) photometric 3D scanning; (iv) shape from shading 3D scanning; (v) 2D optical scanning; (vi) 2D optical touch sensing, using frustrated total internal reflection; and (vii) 2D optical touch sensing, using direct IR illumination FIG. 7 shows a system for structured light 3D scanning with index-matched jamming. A transparent jammable media 703 comprises index-matched Pyrex® glass beads and oil. The Pyrex® glass beads comprise borosilicate glass. For example, the borosilicate glass beads may have the following composition: 80.6% $SiO_2$, 12.6% $B_2O_3$, 4.2% $Na_2O$, 2.2% $Al_2O_3$, 0.04% $Fe_2O_3$, 0.1% CaO, 0.05% MgO, and 0.1% Cl. The transparent jammable media is enclosed by a flexible silicone membrane 701 and a clear acrylic plate 705. A structured light IR projector 709 projects structured light on the underside of a thin, flexible silicon membrane 701. An IR camera 711 records the resulting optical pattern. A visible light graphics projector 713 can project graphics for user interaction. A hydraulic pump 715 can pump liquid into and out of a reservoir 717, in order to jam or unjam the jammable media. 703. A computer 707 interfaces with the pump, IR projector visible light projector, and camera.

The greyscale surface image from the structured light capture system may also be used to track touch points. The IR projector 709 illuminates the thin, flexible, silicon skin, and the IF camera 711 captures reflections from the fingers as they make contact.

In FIGS. 7-13, the jammable media 703, 813, 913, 1013, 1113, 1213, 1313 is illustrated as spheres. In practice, however, the jammable media is transparent. In FIGS. 7-13, the transparent jammable media 703, 813, 913, 1013, 1113, 1213, 1313 comprises index-matched particles and liquid. The jammable media can be jammed or unjammed, depending on the hydraulic pressure transmitted from a hydraulic pump and reservoir through a connection 704, 815, 915, 1015, 1115, 1215, and 1315.

Figure 8:
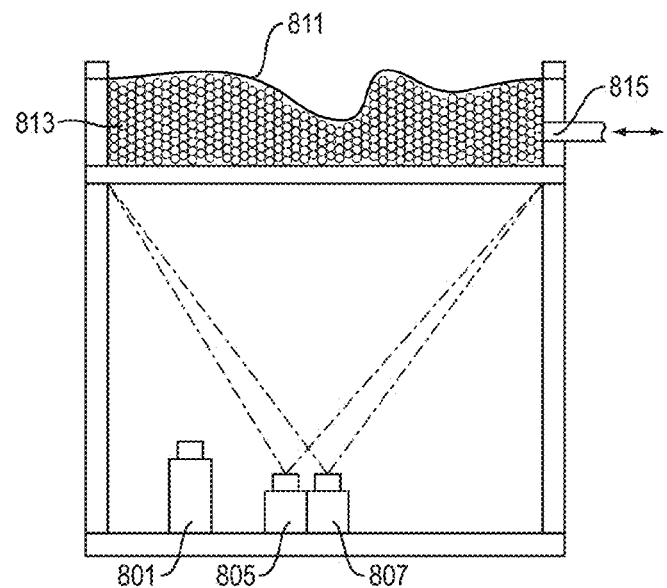
FIG. 8 shows a system for stereo vision 3D scanning with index-matched jamming.

FIG. 8 shows a system for stereo vision 3D scanning with index-matched jamming. A light source 801 illuminates the underside of the silicon surface 811 through a transparent jammable media 813 comprising index-matched particles and fluid. Two cameras 805, 807 record the scene in stereo. For example, a visible light source and two visible light cameras can be used, or an IR light source and two IR cameras can be used.

Figure 9:
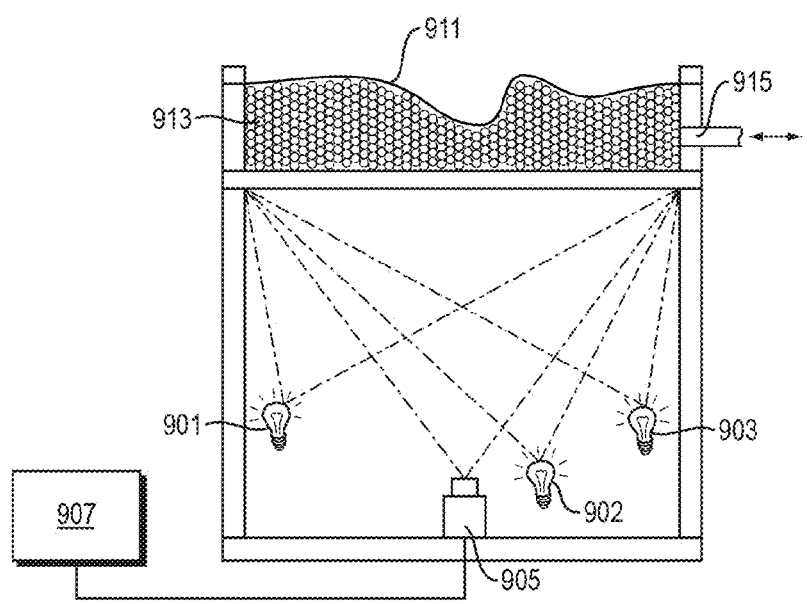
FIG. 9 shows a system for photometric 3D scanning with index-matched jamming.

FIG. 9 shows a system for photometric 3D scanning with index-matched jamming. Multiple light sources 901, 902, 903 illuminate the underside of the silicon surface 911 through a transparent jammable media 913 comprising index-matched particles and fluid. The multiple light sources 901, 902, 903 are either time synchronized or are different colors, from which the camera 905 and computer 907 are able to reconstruct the 3D shape.

Figure 10:
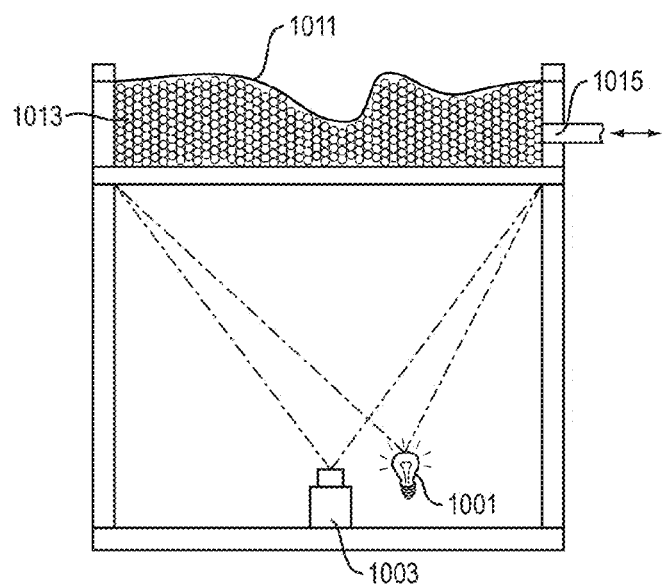
FIG. 10 shows a system for shape from shading 3D sensing with index-matched jamming.

FIG. 10 shows a system for shape from shading 3D sensing with index-matched jamming. A single light source 1001 illuminates the underside of the silicon surface 1011 through a transparent jammable media 1013 comprising index-matched particles and liquid. A camera 1003 records the scene.

Figure 11:
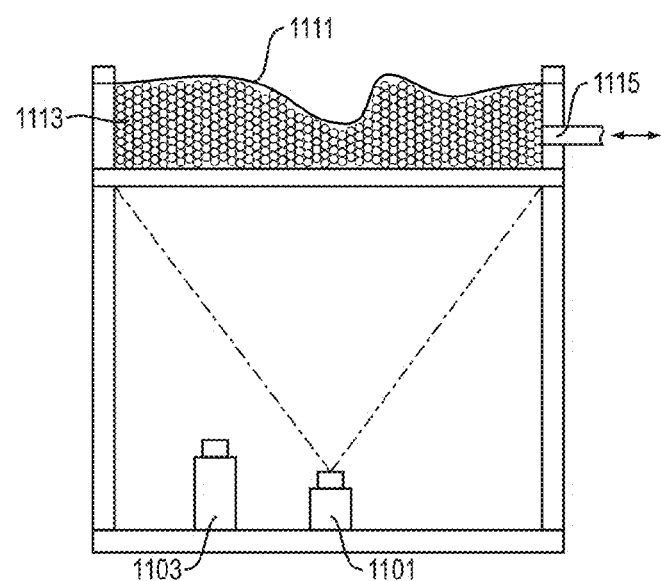
FIG. 11 shows a system for 2D optical sensing with index-matched jamming.

FIG. 11 shows a system for 2D optical sensing with index-matched jamming. The scene is illuminated by a light source 1103 and recorded by a camera 1105. The camera captures 2D surface texture at contact points (where the user is pressing against a thin, flexible, semitransparent, silicon surface 1111), through the transparent jammable media 1113.

Figure 12:
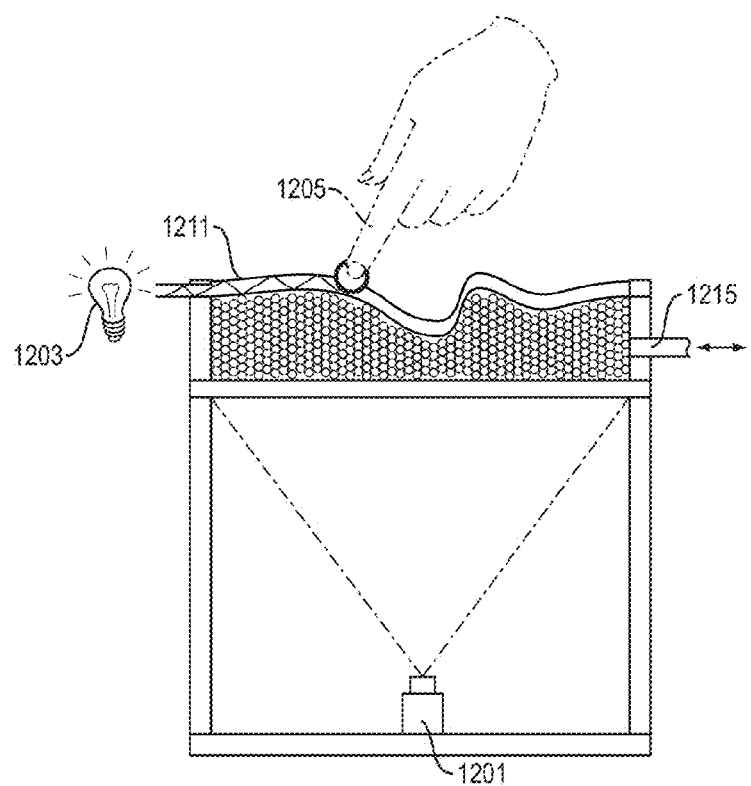
FIG. 12 shows a system for 2D optical touch sensing, using frustrated total internal reflection and index-matched jamming.

FIG. 12 shows a system for 2D optical touch sensing, using frustrated total internal reflection and index-matched jamming. Light from a light source 1203 bounces inside a flexible silicon skin 1211 of the jammable structure due to total internal reflection, until the reflection is frustrated by a user's finger 1205, causing light to escape the skin and be captured by a camera 1201.

Figure 13:
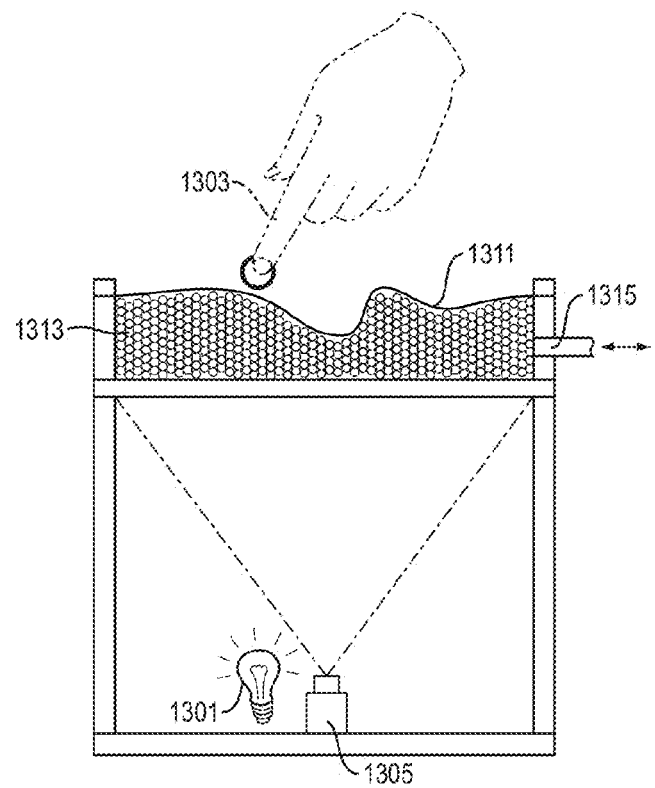
FIG. 13 shows a system for 2D optical touch sensing, using direct IR illumination and index-matched jamming.

FIG. 13 shows a system for 2D optical touch sensing, using direct IR illumination and index-matched jamming. An IR light source 1301 illuminates objects (e.g. a user's finger 1303) as they approach a thin, flexible, semitransparent silicon surface 1311. An IR camera 1305 records the scene.

Hydraulic jamming with index matching has advantages: it provides high-resolution shape and deformation tracking combined with touch sensing. However, camera and optical sensor placement restricts the system's flexibility, and non-perfect index-matching complicates sensing at greater depths as transparency decreases.

Capacitive Sensing:

In some implementations of this invention, capacitive sensing provides a scalable embedded approach to sensing shape in jamming interfaces, including deformations such as stretching, bending and twisting. In contrast to other techniques (e.g., resistive pressure sensors or electric impedance tomography), capacitive distance and shape sensing do not rely on a present applied force to the sensor. This makes it advantageous for both absolute and relative input.

The amount of known dielectric material between two electrodes can be measured through capacitance, and correlated with the distance between them.

In a jammable prototype of this invention with capacitive sensing, an electrode transmits a reference square wave in the 100 kHz range to a receiving electrode, and the signal is sampled by a 12-bit A/D converter in an ARM® microcontroller running at 72 MHz. Synchronous under-sampling to demodulate the signal and recover the original amplitude, which is proportional to the capacitance between the electrodes. 32 samples are averaged to remove white noise.

In this jammable prototype with capacitive sensing, stretchable and bendable receiving electrodes are positioned in an upper, flexible surface of the jammable structure. The receiving electrodes comprise a silver-plated 76% nylon, 24% elastic fiber fabric, which has a low surface resistivity, and can be stretched up to twice its length. The fabric is insulated in a non-conductive silicone cast (which silicon cast comprises the flexible upper surface of the jammable structure). Transmit electrodes are placed on the bottom of the device, under the jammable media. Pyrex® borosilicate glass beads are used as the dielectric material (and as particles in the jammable media). Pyrex glass beads have a dielectric constant of 4.6, whereas air has a dielectric constant of 1.00059. Assuming a random close-packing of glass spheres, 64% of the volume will be glass and 36% will be air, resulting in an overall average dielectric constant of 3.3.

Hydraulic jamming greatly increases this dielectric constant. Using water with glass beads in the jamming volume can approach an average dielectric constant of 30 and increase sensing resolution at larger distances. With simple two-electrode capacitive sensing through glass beads, the system can measure distances of 0-20 cm, with 5 mm or better accuracy (accuracy increases when the two plates are closer to each other).

In this jammable prototype with capacitive sensing, rows of transmitting electrodes are positioned in a rigid back, and columns of receiving electrodes are positioned in a flexible skin. One or more processors (i) determine the jammable volume's shape through time-division-multiplexing for each of the intersections in the sensing matrix and (ii) output a 3D depth map.

In this prototype, a 9×9 electrode grid is used. The grid measures 25×17.5×3 cm$^3$ with an active sensing volume of 18×11.5×3 cm$^3$. An overall 25-mm thickness filled with 2 mm glass beads are sealed within a highly flexible upper membrane and a bendable, yet relatively rigid, bottom surface. This jammable device with capacitive sensing can be placed on a desk, or embedded in the back of a mobile phone or a tablet. Conductive fabric strips (9×1 cm$^2$ each) are embedded in the flexible skin as receiving electrodes, while strips of copper tape (also 9×1 cm$^2$ each) on the opposing, bottom surface act as transmitting electrodes. In addition, a layer of grounded conductive fabric on top of the flexible skin shields the system from the user. An analog multiplexer connects the receiver electrodes to an amplifier circuit and ADC. The prototype runs at 30 Hz and transmits data over USB serial or wirelessly using Bluetooth®. The depth map is filtered and scaled by a factor of ten through bi-cubic interpolation. Alternately, the speed and resolution can be increased with dedicated hardware, and code-division-multiplexing can be applied for scalability.

Figure 14:
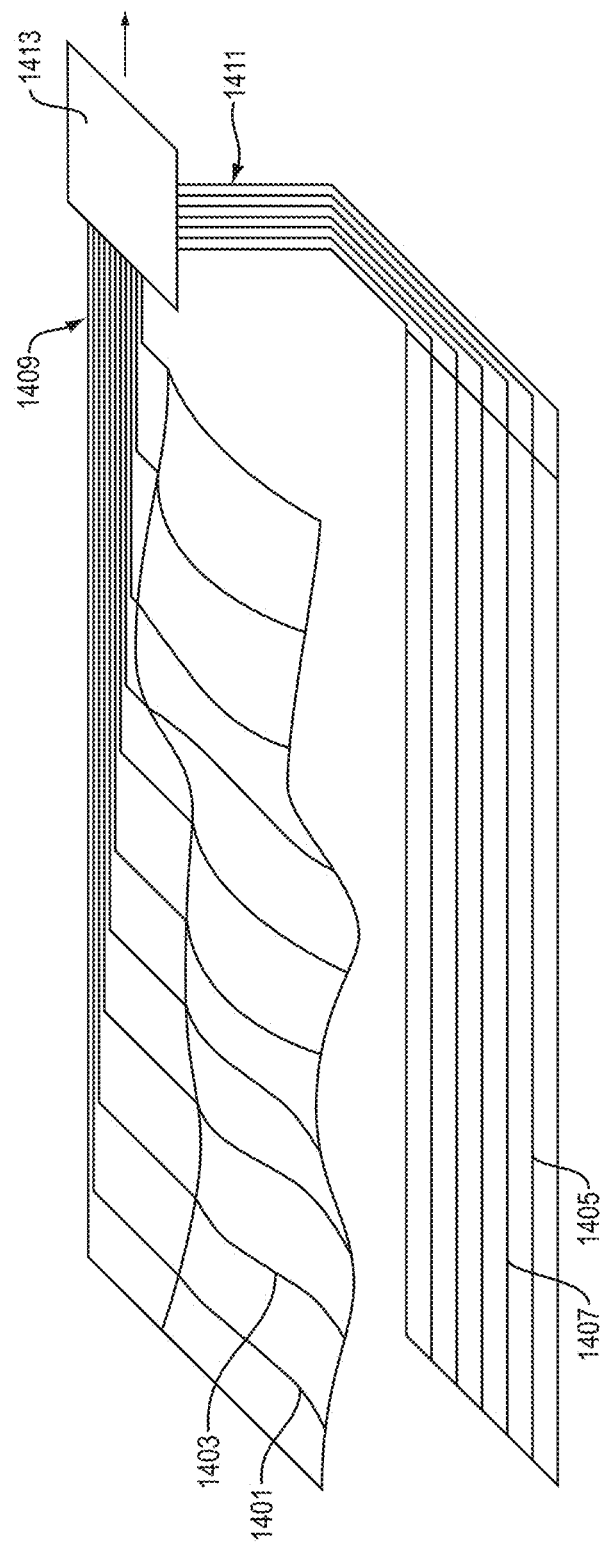
FIGS. 14 and 15 show a system for 3D capacitive sensing for jamming.
Figure 15:
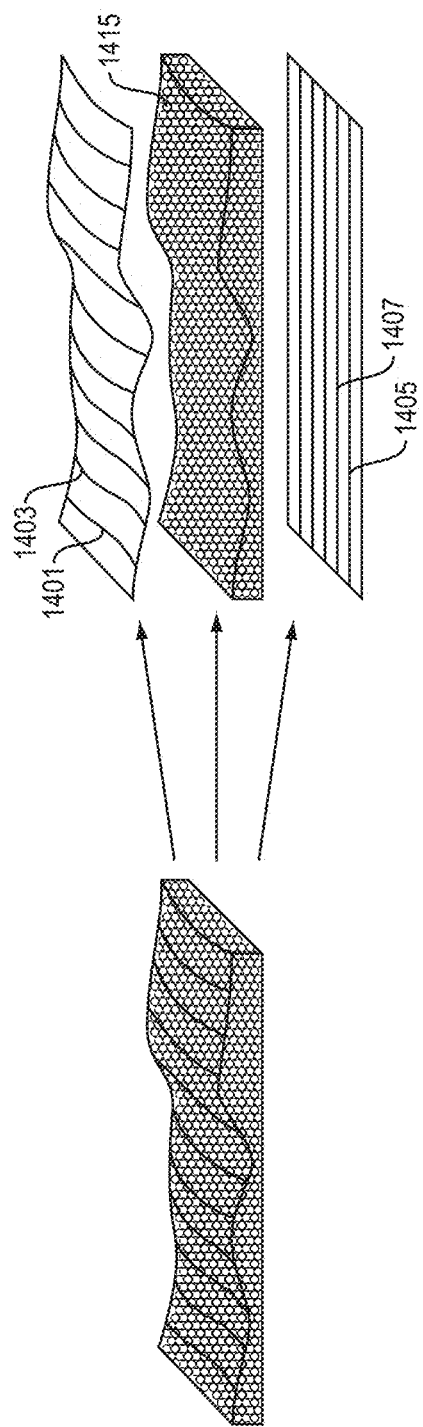

FIGS. 14 and 15 show a system for 3D capacitive sensing for jamming. In this system, the jamming volume's shape is computed by measuring the capacitance at each transmitter-receiver electrode intersection. In FIG. 14, columns of top electrodes (e.g., 1401, 1403) are embedded in a flexible, upper, silicon skin. Rows of bottom electrodes (e.g., 1405, 1407) are attached to a rigid surface. The top electrodes (e.g., 1401, 1403) are stretchable and bendable, and may comprise conductive fabric strips. The bottom electrodes (e.g. 1405, 1407) may comprise strips of copper tape. Lead wires 1409, 1411 connect the bottom and top electrodes, respectively, to a microcontroller 1413. In FIG. 15, the jammable material 1415 is shown.

Separating transmitting and receiving electrodes into rows and columns for deformation sensing is only one approach to capacitive shape sensing electrode layouts. Alternately, each electrode can act as both a transmitter and receiver. This can enable stretch, tilt or twist input to be quantified by measuring capacitance between adjacent electrodes with different layouts.

In some embodiments of this invention, capacitive sensing also supports multi-touch input. In these embodiments, the flexible ground layer is replaced with lines of conductive thread that transmit the same reference signal. This can be used for mutual capacitance touch sensing. When part of a human's body (e.g., a finger or hand) approaches the conductive thread, the part capacitively couples with the system and decreases the signal. Time-division-multiplexing may be used. In that case, the upper receiving electrodes (e.g. 1401, 1403) may be employed both for capacitive shape-sensing below (with the bottom electrodes e.g., 1405 and 1407) and for touch-sensing above (with the lines of conductive threads). This reduces the total number of required electrodes for shape and touch sensing. To improve results, thin conductive threads (sewn in a zig-zag pattern for flexibility) may be used for the lines of conductive thread transmitting the reference signal. The thread is more sensitive (than the thicker conductive stretch fabric) to capacitive coupling from the user. The thread's smaller size results in weaker coupling between transmitting and receiving electrode pairs. When not sensing touch, the conductive thread electrodes can be connected to ground to help shield the device. The mutual capacitance sensing can detect both touch and hovering.

Four Exemplary Applications:

This invention has many practical applications. Here are four non-limiting examples:

Example 1

Tablet Jamming Device

Figure 16A:
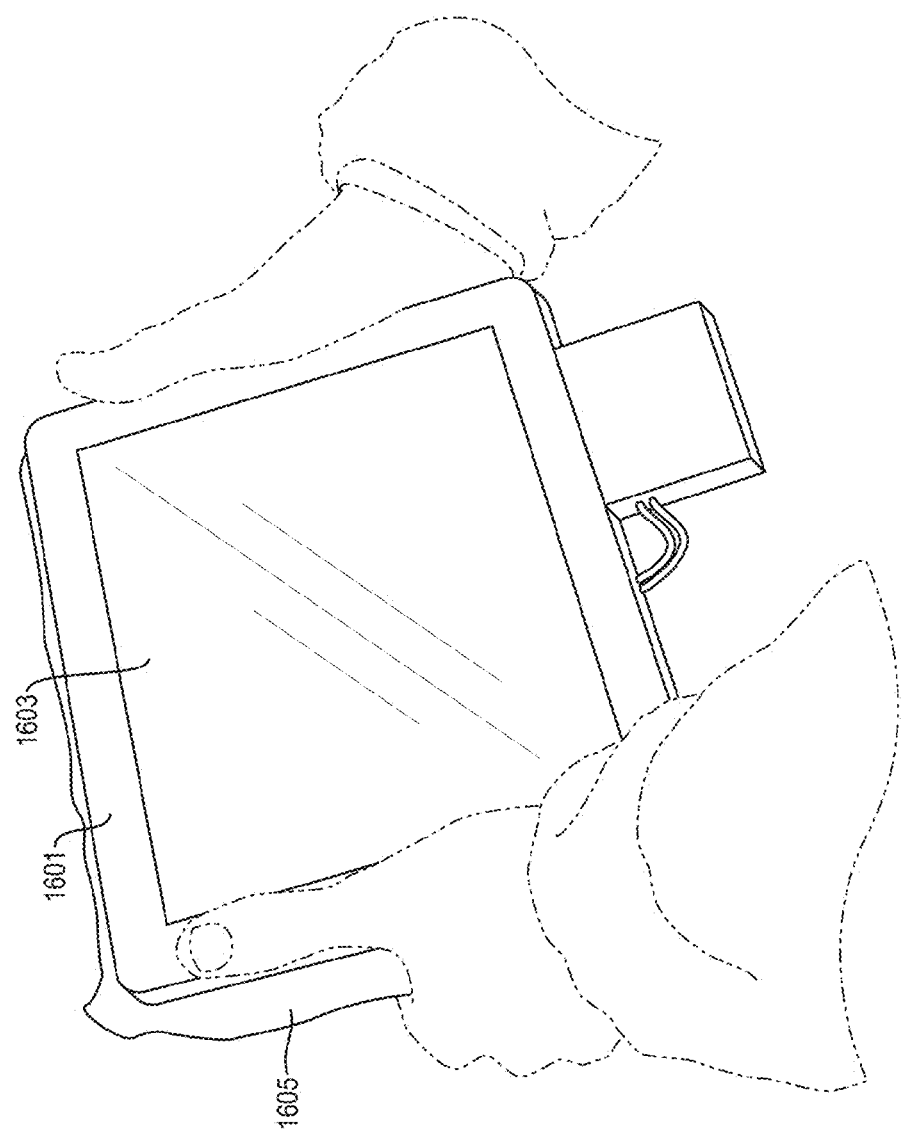

A prototype of this invention is sometimes called a "Tablet Jamming Device". In this prototype, a jammable device is mounted on the back surface of a tablet computer. FIG. 16A shows a front view of the tablet. A user can hold the tablet case 1601 with the user's hands, while watching a screen 1603 on the front of the tablet. The user's fingertips can press into a malleable jammable device 1605 mounted on the back of the tablet. FIG. 16B shows a back view of the tablet. The user can press the user's fingers (e.g., 1607) into the malleable jammable device 1605 in order to provide input to the tablet. Changing stiffness of the malleable device can provide haptic feedback to the user.

The tablet case has an embedded jamming apparatus and capacitive shape deformation sensor for malleable interaction in the back of the tablet. The tablet's rear interface allows users to navigate content on a tablet display by pressing into its malleable surface. For example, a user can make gestures while pressing into malleable surface, in order to browse information displayed on the front screen of the, while the user receives jamming-driven haptic feedback. For example, a user could knead on either side of the tablet back to scroll content in that direction, or use both hands to zoom. When a limit is reached, the corresponding part of the tablet could turn stiff, preventing further kneading. Furthermore, changes in stiffness can enable different modes of user interaction.

In two prototypes of this invention, the mobile jamming platform mounted on the rear of a tablet is pneumatically controlled with an on-board vacuum pump and uses capacitive shape sensing. In one of these two prototypes, a Bluetooth® wireless connection is used to communicate capacitive shape sensing and jamming control to a tablet, which runs an Android® application. The second of these two prototypes uses an iPad® tablet with screen-sharing software to view desktop applications that interface with the hardware over a serial cable.

Example 2

Tunable Clay

Another prototype of this invention is sometimes called "Tunable Clay". This prototype comprises a 30×33 cm$^2$ malleable input device mounted on a tabletop and used for 3D modeling. The prototype can mimic the malleability of clay, which is a continuous material that users can easily deform. In the Tunable Clay prototype, optical sensing— achieved using structured light through the back of the transparent, hydraulic-activated jamming volume—captures the shape in real-time and applies it to a virtual 3D model. The model is shown both on a separate display and through projected graphics on the malleable surface for direct feedback. The sensing and visible projection is integrated beneath the surface to avoid occlusions from user interactions.

Users can control the stiffness of the malleable surface using a potentiometer. This allows users to modify the resolution of manual input, thereby modifying the interface's control gain. A user can increase the stiffness of the interface for detailed work, or can decrease stiffness to ease deformation or to reset the shape. Also, material stiffness can be tuned to comply with different sculpting modes.

Example 3

Haptic Lens

Another prototype of this invention is sometimes called a "Haptic Lens". The Haptic Lens allows a user to feel the stiffness of an underlying region in which an image is displayed. The Haptic Lens uses varying material stiffness as a haptic information channel. It comprises a round metal ring with a transparent base and a soft transparent upper skin (Dragon Skin® 10, available from Smooth-On, Inc., Easton, Pa.) that is tracked on a tabletop display. A jammable volume is positioned between the transparent base and transparent upper skin. A user can feel the apparent stiffness of parts of images by moving and pressing into the jammable 'lens". An object's haptic information channel is represented using 8-bit stiffness values in the alpha channel of the texture. By controlling the degree of jamming inside the lens, the stiffness perceived by the user can vary between a solid object and a liquid.

The jamming device is transparent and controlled hydraulically. The jamming mechanism inside the Haptic Lens can present continuous haptic sensations, such as liquids, which would be challenging to render using mechanical actuators. The transparency and shape of the lens also make it possible to provide users with an optically magnified view of the objects they are touching.

Example 4

ShapePhone

Another prototype of this invention is sometimes called a "ShapePhone". ShapePhone is a user-defined mobile device that can be shaped into different forms and then locked into a rigid device for various forms of interaction. A user can transform the affordance of the device—from a phone, tablet (sheet), remote control, watch, game controller, or ball—by stretching, bending and molding ShapePhone when it is unjammed and thus extremely pliable, due to the stretchy silicone skin. The user can control the jamming state using a small switch. When unjammed, ShapePhone returns to its normal state of a phone-sized rectangle, using the silicone skin as a restoring force.

This prototype uses the Mobile Jamming Platform, described earlier, to control jamming in a small form factor. ShapePhone is entirely self-contained. The phone-shaped hollow silicone (EcoFlex® 0030, available from Smooth-On, Inc., Easton, Pa.) skin was cast from a 3D-printed three-part mold. This particular silicone is very flexible and can stretch up to four times its size. The skin is filled with coffee grounds and sealed with a tube for airflow connected to the MJP.

Capacitive sensing, as described above, may be integrated into the ShapePhone to sense a variety of different shapes. These shapes can be used in addition to contextual information gathered through other sensors, or program state, to enable further functionality. Capacitive touch sensing can also be used for user input and to recognize how the user is holding the device.

This same jamming phone device could also be used for interaction and haptic feedback while in a pocket. Changes in stiffness can convey battery life, for example, letting the ShapePhone "melt" when it runs out of battery, or allowing user input through the pocket using squeezes or deformations.

In exemplary implementations of this invention, one or more computer processors are specially adapted: (1) to control the operation of hardware components of the jammable system, including pumps, valves, light sources, visual display, cameras and transmitting electrodes and receiving electrodes for capacitive sensing, (2) to process sensor data, (3) to determine shape of a flexible layer, (4) to determine human touch of or proximity to the flexible layer, (5) to output signals for controlling transducers for outputting information in human perceivable format, and (6) to process data, perform computations, and control the read/write of data to and from memory devices. The one or more processors may be located in any position or position within or outside of the jammable structure. For example: (1) at least some of the one or more processors may be embedded within or housed together with other components of the device, such as cameras, pumps, valves, light sources, and jammable structures, and (2) at least some of the one or more processors may be remote from other components of the device. The one or more processors may be connected to each other or to other components either: (1) wirelessly, (2) by wired connection, or (3) by a combination of wired and wireless connections. Items 201, 307, 403, 707 and 907 each, respectively, represent either (1) one or more of these computer processors, or (2) a device (such as a computer, microprocessor or control circuit) that includes one or more of these computer processors.

DEFINITIONS AND CLARIFICATIONS

Here are a few definitions and clarifications. As used herein:

The terms "a" and "an", when modifying a noun, do not imply that only one of the noun exists.

The term "Bluetooth®" means wireless communication that is compliant with standards adopted by the Bluetooth® Special Interest Group.

The term "comprise" (and grammatical variations thereof) shall be construed broadly, as if followed by "without limitation". If A comprises B, then A includes B and may include other things.

The terms "detecting" or "determining" the shape of a layer shall be construed broadly. For example, "detecting" or "determining" the shape of a layer includes determining 2D locations at which objects (such as user's fingers) are pressing against the layer.

The terms "e.g." and "such as" means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "granular particles" shall be construed broadly. For example, the term "granular particles" includes (i) beads, (ii) ball bearings, (iii) nuts, (iv) pieces of coal, (v) grains of sand, rice, coffee or fertilizer, (vi) flakes of dry cereal, or (vii) powder. Also, the term "granular particles" includes any discrete solid, macroscopic particles characterized by a loss of energy whenever the particles interact.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

"Infrared light" means light with a wavelength between 700 nm and 1 mm.

A material is "jammable" if the stiffness of the material can be varied by changing how closely granular particles in the material are packed. A "jammable media" is a jammable material that comprises granular particles and interstitial fluid (e.g., gas or liquid). A "jammable structure" comprises a jammable media and a container configured to contain the jammable material. A "jammable structure" may have an opening to the exterior that allows fluid to be added to or withdrawn from the jammable media. At least part of the container may be flexible, stretchable or both.

A first refractive index and a second refractive index are "matched" if the absolute value of the difference between the first and second refractive indices is less than or equal to 0.01. Similar terms, such as "index-matched", shall be construed accordingly.

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

The term "portable electronic device" includes a cell phone, smartphone, tablet computer, laptop, e-reader, remote control, electronic watch, or electronic game controller.

The term "transparent" shall be construed broadly. A material is "transparent" if it is transparent in all or part of the visible light spectrum or all or part of the infrared light spectrum, or both. A "transparent" material does not need to be perfectly perlucid (i.e. allow visible or infrared light to pass through the material without any scattering at all) in order to be transparent. Also, a material does not need to allow 100% of incident visible light (or incident infrared light) to pass through it, in order to be "transparent".

Electromagnetic waves "travel through" a jammable media if they pass through the media, from one side of the media to another side of the media. If waves just slightly penetrate an exterior surface of the jammable media and then reflect out through the same surface, then the waves do not "travel through" the media.

A list of multiple steps in a process does not imply, except to the extent that the context requires otherwise, that: (1) the steps occur in any particular order or sequence, including the order or sequence listed; (2) the steps occur only once; (3) the different steps occur the same number of times during the process, or (4) a particular step is applied to the same thing each time that the particular step occurs (for example, except to the extent that the context requires otherwise, a specific step that is described as applying to "a layer" may apply to a different layers in a layered object each time that this specific step occurs). For purposes of this grammatical paragraph, "list" includes "description" or "describe".

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the noun "transparency" shall be construed in like manner as the defined adjective "transparent".

Variations:

This invention may be implemented in many different ways. Here are some non-limiting examples.

Air compressors can be run at lower voltages to reduce loudness, if slower actuation speed is acceptable. The effect of gravity in a mobile jamming system can also be addressed using multiple compartments to constrain material placement.

Actuation (e.g., by pneumatic artificial muscles or other inflatable structures) can be used to quickly change state.

A wide variety of materials may be used for embedded electrodes and wiring, instead of or in addition to those described above. For example, embedded liquid metal and saltwater may be used for stretchable capacitive shape sensing.

In order to detect human input, one or more sensors may be used to determine the shape of the flexible layer of the jammable structure. The sensors output data that is indicative of electromagnetic waves that have traveled through the jammable media or of electrical or magnetic phenomena that are produced by waves that have traveled through the jammable media. In exemplary embodiments of this invention: (a) the electromagnetic waves have a wavelength longer than or equal to 10 nm and have a frequency less than or equal to 30 PHz (i.e., the waves are not x-rays or gamma rays); (b) the phenomena does not consist of nuclear magnetic resonance, and (c) the sensors are not used for magnetic resonance imaging.

This invention may be implemented as a method of detecting the shape of a flexible layer of a jammable structure, wherein: (a) the jammable structure comprises a jammable media surrounded, at least in part, by the flexible layer; (b) the method comprises, in combination, (i) using one or more sensors to output sensor data, which data is indicative of electromagnetic waves that have traveled through the jammable media or indicative of electrical or magnetic phenomena that are produced by the waves, and (ii) using one or more processors to analyze the data to determine the shape; and (c) the waves have a wavelength longer than or equal to 10 nm and the phenomena does not consist of nuclear magnetic resonance. Furthermore: (1) the one or more sensors may comprise one or more optical sensors and the waves may comprise visible light or infrared light; (2) the jammable media may comprise a liquid and granular particles, which fluid and particles have matching indices of refraction; (3) the waves may comprise structured infrared light; (4) the sensor data may be indicative of a optical pattern printed on a side of the surface; (5) the one or more optical sensors may comprise at least two cameras, and the method may further comprise using the one or more processors to determine the shape based at least in part on stereopsis indicated by the sensor data; (6) the waves may originate from multiple lights sources, which light sources either are of differing colors or are illuminated in a temporal sequence, and the method may further comprise using the one or more processors to analyze data indicative of shadows to determine the shape; (7) the method may further comprise using frustrated total internal reflection to determine positions at which a human is pressing against the surface; (8) the waves may be transmitted by transmitting electrodes, pass through the jammable media, and be received by receiving electrodes, and the method may further comprise capacitive sensing, in which the one or more processors determine distance between a specific transmitting electrode, out of the transmitting electrodes, and a specific receiving electrode, out of the receiving electrodes, by determining a value indicative of amplitude of the waves received by the specific receiving electrode; (9) the jammable media may comprise a gas and granular particles; (10) the jammable media may comprise a liquid and granular particles; (11) the method may further comprise using mutual capacitive sensing to detect touch by a human of the surface or proximity of a human to the surface; and (12) the method may further comprise time-multiplexing the receiving electrodes, such that at some times the receiving electrodes receive signals from the transmitting electrodes and output data used by the one or more processors for determining the shape, and at other times the receiving electrodes receive signals from additional transmitting electrodes and output data used by the one or more processors to detect the touch or the proximity.

This invention may be implemented as apparatus comprising, in combination: (a) a jammable structure, which jammable structure comprises a jammable media surrounded, at least in part, by a flexible layer; (b) one or more sensors, the one or more sensors being configured to output sensor data, which data is indicative of electromagnetic waves that have traveled through the jammable media or is indicative of electrical or magnetic phenomena that are produced by the waves, and (c) one or more processors which are configured to analyze the data to determine shape of the flexible layer; wherein the waves have a wavelength longer than or equal to 10 nm and the phenomena does not consist of nuclear magnetic resonance. Furthermore: (1) the jammable structure may be part of, or configured to be affixed to, a mobile electronic device; (2) the one or more sensors may comprise one or more optical sensors and the waves may comprise visible light or infrared light; (3) the jammable media may comprise a liquid and granular particles, which liquid and particles have matching indices of refraction; (4) the jammable media may comprise a gas and granular particles; (5) the one or more sensors may be configured for capacitive sensing; and (6) at least some of the sensors may comprise a set of electrodes, which set comprises transmitting electrodes positioned on one side of the jammable structure and receiving electrodes positioned on an opposite side of the jammable structure, the transmitting electrodes being configured to transmit the waves through the jammable media to the receiving electrodes, and the one or more processors may be further configured to determine distance between a specific transmitting electrode, out of the transmitting electrodes, and a specific receiving electrode, out of the receiving electrodes, by determining a value indicative of amplitude of the waves received by the specific receiving electrode.

It is to be understood that the methods and apparatus that are described herein are merely illustrative applications of the principles of the invention. Numerous modifications may be made by those skilled in the art without departing from the scope of the invention.

What is claimed is:
1. A method of detecting the shape of a flexible layer of a jammable structure, wherein:
    (a) the jammable structure comprises a jammable media and a container that contains the jammable media;
    (b) the container comprises, at least in part, the flexible layer;
    (c) the jammable media comprises granular particles and interstitial fluid that have matching indices of refraction;
    (d) the jammable media has a stiffness that varies depending on how closely the granular particles are packed; and
    (e) the method comprises, in combination,
        (i) one or more optical sensors taking measurements of infrared or visible light that has traveled through the jammable media, and
        (ii) one or more processors analyzing the measurements to determine the shape of the flexible layer.
2. The method of claim 1, wherein the interstitial fluid comprises a liquid.
3. The method of claim 2, wherein the waves comprise structured infrared light.
4. The method of claim 2, wherein the measurements are indicative of a optical pattern printed on a side of the surface.
5. The method of claim 2, wherein:
    (a) the one or more optical sensors comprise at least two cameras; and
    (b) the method further comprises the one or more processors etermining the shape based at least in part on stereopsis indicated by the measurements.
6. The method of claim 2, wherein:
    (a) the waves originate from multiple lights sources, which light sources either are of differing colors or are illuminated in a temporal sequence; and
    (b) the method further comprises the one or more processors analyzing data indicative of shadows to determine the shape.
7. The method of claim 2, wherein the method further comprises using frustrated total internal reflection to determine positions at which a human is pressing against the surface.
8. Apparatus comprising, in combination:
    (a) a jammable structure that comprises
        (i) jammable media, which jammable media
            (A) comprises granular particles and interstitial fluid that have matching indices of refraction, and
            (B) has a stiffness that is variable, depending on how closely the granular particles are packed, and
        (ii) a container for containing the jammable media, which container comprises, at least in part, a flexible layer;
    (b) one or more optical sensors configured to take measurements of infrared or visible light that has traveled through the jammable media; and

(c) one or more processors which are configured to analyze the measurements to determine shape of the flexible layer.

9. The apparatus of claim 8, wherein the jammable structure is part of, or configured to be affixed to, a mobile electronic device.

10. The apparatus of claim 8 wherein the interstitial fluid comprises a liquid.

* * * * *